Jan. 2, 1945.  A. DE L. SINDEN  2,366,569
CONVEYER
Original Filed April 3, 1940
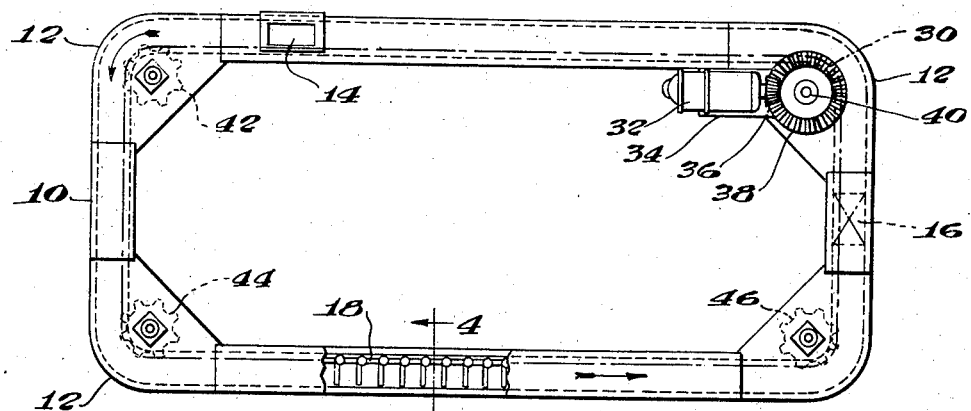
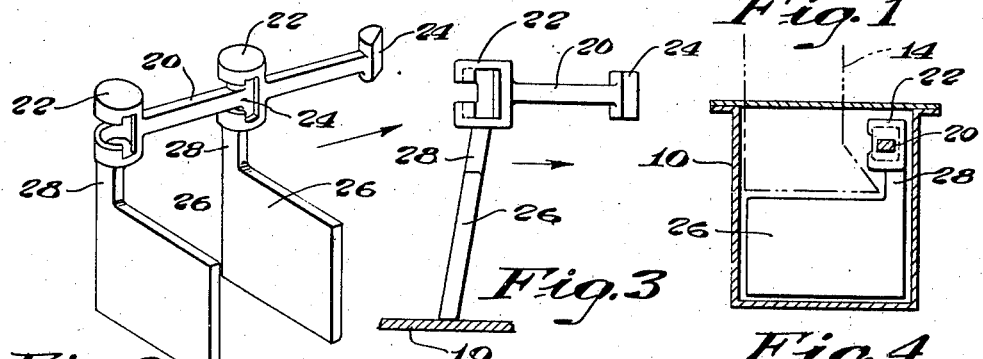
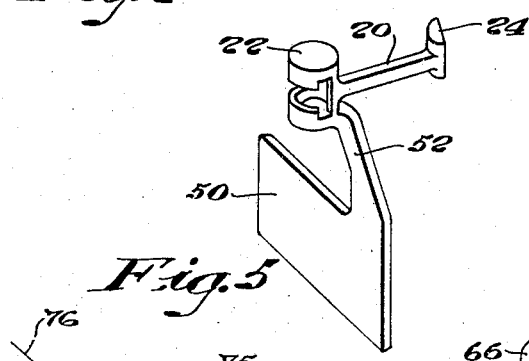
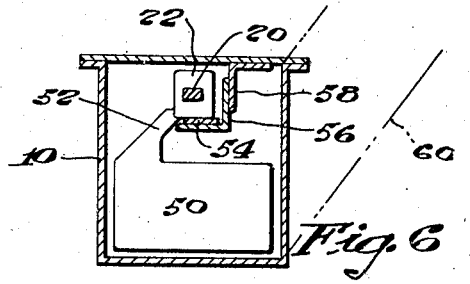
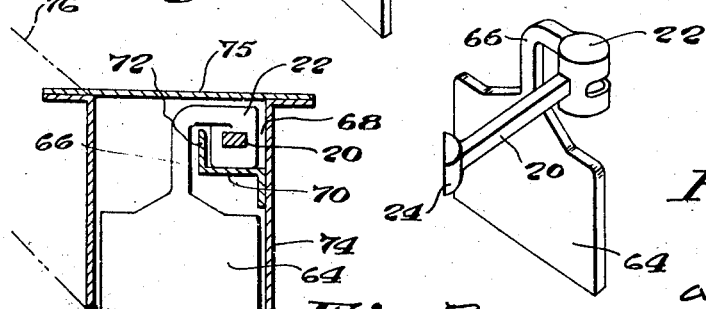

Patented Jan. 2, 1945

2,366,569

UNITED STATES PATENT OFFICE 2,366,569

CONVEYER

Alfred De Los Sinden, Aurora, Ill., assignor to Redler Conveyor Company, Quincy, Mass., a corporation of Massachusetts Original application April 3, 1940, Serial No. 327,667, now Patent No. 2,277,039, dated March 24, 1942. Divided and this application January 19, 1942, Serial No. 427,312

2 Claims. (Cl. 198—174)

This invention relates to a conveyer and to a conveying element therefor.

The invention has for an object to provide a novel and improved conveyer which is particularly adapted among other uses for conveying material in curved paths lying substantially in the same plane and embodying a novel structure of conveying element.

With this general object in view and such others as may hereinafter appear, the invention consists in the conveyer and in the various structures, arrangements and combinations of parts hereinafter described and particularly defined in the claims at the end of this specification.

In the drawing illustrating the preferred embodiment of the invention, Fig. 1 is a plan view of a conveyer embodying the present invention; Fig. 2 is a perspective detail view of a portion of the conveying element employed in the conveyer; Fig. 3 is a side elevation of one of the flights of the conveying element shown in Fig. 2; Fig. 4 is a cross-sectional view taken on the line 4—4 of Fig. 1; Fig. 5 is a perspective view of a modified form of flight for the conveying element; Fig. 6 is a sectional view showing the flight of Fig. 5 in the conveyer; Fig. 7 is a sectional view of another modified form of flight for the conveying element; and Fig. 8 is a perspective view of the flight shown in Fig. 7.

In general, the present invention contemplates a conveyer of the type in which the material is conveyed through a trough or casing by a plurality of connected conveyer flights. In the preferred and illustrated embodiment of the invention, the conveyer comprises a trough or casing 10 which is herein shown as extending in a general rectangular path and with the corner portions 12 curved, as illustrated. The casing may and preferably will be provided with the usual inlet 14 and outlet 16, as illustrated.

The present conveying element, indicated generally at 18, is made up of a plurality of connected flights or links of solid construction, one embodiment of which, as illustrated in detail in Fig. 2, may comprise a connecting link 20 having a slotted hub 22 at one end and having a boss 24 at the other end which is adapted to be received within the hollow hub 22 of the next succeeding flight of the conveying element. In the embodiment shown in Fig. 2, a solid flight member 26 of general rectangular shape is connected integrally with the hollow hub 22 by a depending portion 28, and the flight member is disposed substantially at right angles to the link 20, extending transversely from one side of the casing 10, as illustrated in Fig. 4.

In the illustrated embodiment of the invention, the conveying element 18 is arranged to be drawn through the casing 10 by a driving sprocket 30 which is driven from a suitable source of power, such as a motor 32, mounted on a base 34 attached to the upper section of the casing above the conveying element. The sprocket 30 is driven through bevel gears 36, 38, the latter being fixed to a vertical shaft 40 upon which the sprocket 30 is secured. Idler sprockets 42, 44, 46 are also provided at the corners 12 over which the conveying element is arranged to pass. As clearly illustrated in Fig. 3, the individual flight members 26 are slightly inclined rearwardly with respect to the direction of travel through the casing, as indicated by the arrows, so that in operation, as the flights are dragged through the conveyer they will tend to glide smoothly along the bottom wall of the casing 10, thus reducing to a minimum the vibration and noise ordinarily resulting from contact of the flight members with the casing.

From the description thus far, it will be observed that, in operation, the material introduced into the conveyer through the inlet 14 is carried along between the flight members 26 and is arranged to fall by gravity through the discharge opening 16. As shown in dotted lines in Fig. 4, the inlet hopper 14 may be extended into the casing below the level of the connecting links 20 in order to determine the level of the material in the casing. The links are thus disposed above the level of the material, and as a result of this construction, during the operation of the conveyer, minimum opportunity is afforded the goods to enter the slotted hubs 22, and as a result, maximum freedom of pivotal movement is afforded the parts as the conveyer element is drawn through the casing. Sufficient clearance is provided between the side edges of the flights and the walls of the casing to provide for maximum efficiency in performance, and in operation, as the material is carried along between the flights, it tends to level itself off. The solid construction of the flight members is particularly advantageous when conveying certain non-freely flowing materials where it is desired to entirely clear the conveyer of material when the supply thereto is cut off in order to permit the conveyer to be used for running a different kind of material.

Referring now to Figs. 5 and 6, as therein shown, a modified form of a conveying element of solid construction may comprise a plurality of connected members, each comprising the link 20 having a hollow hub portion 22 at one end and a boss 24 at the other end, and also having a solid flight member 50 of general rectangular shape integrally connected to the hollow hub portion of the link by a connecting portion 52. In this modification, the link is disposed above and substantially intermediate the side edges of the solid flight 50 and the connecting portion 52 is angularly extended from one edge of the flight to the hollow hub 22. Provision is also made for supporting the conveying element in the casing, and as shown herein, a track 54 is provided within the casing, arranged to receive the link portions of the conveying element with the hub portions 22 in sliding engagement with the track or rail 54. The rail is supported in an intermediate position with respect to the side walls of the casing by angle members 56, 58 mounted, as shown upon the underside of the top section of the casing. The material may be introduced into the casing 10 through a side limit 60, as shown in Fig. 6. With this construction, the conveying element 18 is supported to dispose the bottom edge of the flight slightly above the bottom wall of the casing to reduce to a minimum noise and wear. The supporting angle members form a guard to prevent the material from coming in contact with the connecting links. In operation, the material tends to level itself off to a height substantially even with the top edge of the flight members 50.

Another modification of the solid flight conveying element, as illustrated in Figs. 7 and 8, may comprise a plurality of connected flight members, each having link portions 20, 22, 24 and a solid flight portion 64 integrally connected with the hollow hub portion 22 by a connecting member 66 extending vertically from a position intermediate the side edges of the solid flight member and then horizontally to one side to connect with the top of the hollow hub portion 22, as shown in Fig. 7. As illustrated, the link portion is disposed above and to one side of the solid flight member, and is arranged to run in a separate trough or track 68 disposed within the casing whereby to support the conveying element in a predetermined position with respect to the casing. The trough 68 may be supported from one side wall 74 of the casing and is provided with a horizontally extended portion 70 and an upstanding edge portion 72 which, in cooperation with the side wall 74 of the casing 10, serves as a guide to limit the lateral movement of the link portion and the solid flight member. Likewise, the horizontally extended portion 70 in cooperation with the top section 75 of the casing serves to limit vertical movement of the flight members. The material may be introduced into the casing through a side inlet 76, as indicated by dotted lines in Fig. 7. The conveyer thus constructed provides maximum support for the conveying element and also provides maximum protection for the link portions from contact with the material in the casing.

From the above description it will be observed that the present construction of a conveyer provided with a conveying element having solid flight members is adapted to efficiently convey materials in various paths and particularly in curved paths lying substantially in the same plane and the conveyer is particularly adapted to be used for conveying non-freely flowable materials.

This application is a division of my application Serial No. 327,667, filed April 3, 1940, and issued March 24, 1942, as Patent No. 2,277,039.

While the preferred embodiment of the invention has been herein illustrated and described, it will be understood that the invention may be embodied in other forms within the scope of the following claims.

Having thus described the invention, what is claimed is:

1. In a conveyer, a substantially horizontal casing having a bottom, top and side wall, a conveyer element adapted to be drawn through the casing having a plurality of solid flights, means disposed within the casing for pivotally connecting the flights, an inlet in one side of the casing arranged with relation to said pivotal connections between the flights to effect the disposition of the material entering the casing so that its angle of repose is below said pivotal connections, and track means within the casing and carried thereby for suspending and supporting the flights within the casing, said track means having an upright portion and a connecting horizontal portion both serving as a shield to prevent material entering the casing through said inlet from contacting the pivotal connections between the flights.

2. A conveyer as defined in claim 1 wherein the conveyer flights are provided with arms extending to within the track means for connecting the body of the flight with the pivotal connection.

ALFRED DE LOS SINDEN.